(12) United States Patent
Sheppard et al.

(10) Patent No.: US 7,624,149 B2
(45) Date of Patent: Nov. 24, 2009

(54) INSTANT MESSAGING WITH AUDIO

(75) Inventors: Adam Sheppard, Seattle, WA (US); Christopher Velasco, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 764 days.

(21) Appl. No.: 10/941,455

(22) Filed: Sep. 15, 2004

(65) Prior Publication Data
US 2006/0059236 A1 Mar. 16, 2006

(51) Int. Cl.
*G06F 15/16* (2006.01)
(52) U.S. Cl. ...................................... 709/206
(58) Field of Classification Search ................. 709/206, 709/204
See application file for complete search history.

(56) References Cited

U.S. PATENT DOCUMENTS

| | | | | |
|---|---|---|---|---|
| 6,807,254 | B1 * | 10/2004 | Guedalia et al. | 379/88.1 |
| 7,103,681 | B2 * | 9/2006 | Coulombe | 709/246 |
| 7,152,093 | B2 * | 12/2006 | Ludwig et al. | 709/204 |
| 7,206,809 | B2 * | 4/2007 | Ludwig et al. | 709/204 |
| 7,334,043 | B2 * | 2/2008 | Daigle et al. | 709/231 |
| 7,519,667 | B1 * | 4/2009 | Capps | 709/206 |
| 2004/0024822 | A1 * | 2/2004 | Werndorfer et al. | 709/206 |
| 2004/0054740 | A1 * | 3/2004 | Daigle et al. | 709/206 |
| 2004/0064696 | A1 * | 4/2004 | Daigle et al. | 713/168 |
| 2005/0086309 | A1 * | 4/2005 | Galli et al. | 709/206 |
| 2005/0086311 | A1 * | 4/2005 | Enete et al. | 709/206 |
| 2005/0204309 | A1 * | 9/2005 | Szeto | 715/811 |
| 2005/0262204 | A1 * | 11/2005 | Szeto et al. | 709/206 |
| 2006/0168004 | A1 * | 7/2006 | Choe et al. | 709/206 |

OTHER PUBLICATIONS

Yahoo! Messenger, website: http://messenger.yahoo.com/audibleshomenf.php, 2004, printed on Jun. 25, 2004, 1 page.

* cited by examiner

*Primary Examiner*—William C Vaughn, Jr.
*Assistant Examiner*—Thomas Richardson
(74) *Attorney, Agent, or Firm*—Lee & Hayes, PLLC

(57) ABSTRACT

Instant messaging with audio is described. In an implementation, a method includes receiving an input during an instant messaging session indicating a selection of at least one of a plurality of audio items from an audio menu. The plurality of audio items is taken from a content item. An output is caused of the selected audio item by one or more of a plurality of computing devices that participates in the instant messaging session.

36 Claims, 11 Drawing Sheets

INSTANT MESSAGING WITH AUDIO

TECHNICAL FIELD

The present invention generally relates to instant messaging, and more particularly relates to instant messaging with audio.

BACKGROUND

Instant messaging is an increasingly popular communication tool that enables two or more users to exchange messages via a network. For instance, when two users are online at the same time, instant messages may be exchanged in real time between the two users. In this way, the instant messages may be utilized to support a text conversation between the two users in a manner that mimics how the two users would participate in a typical spoken conversation.

While instant messaging is an effective tool for communication, a traditional instant messaging experience is restricted to using graphics and therefore has limited richness. For example, text messages that are exchanged between two users may have limited context due to a lack of voice inflection and mannerisms that otherwise would be experienced by the users if they were face-to-face or even speaking on the phone. Therefore, these text messages are limited in how they may be utilized to convey ideas and emotions. Such limitations may result in the inability of the participants to accurately portray ideas behind the text message, thereby subjecting the text messages to erroneous interpretations. For example, humor and sarcasm may be difficult to accurately portray due to the limitations of text messaging and the real-time nature of instant messaging. For instance, because instant messages may be exchanged in real time, a user may have a limited amount of time to compose a message and therefore may not adequately consider all the possible interpretations of a text message.

One method utilized to add richness to text messages involves the use of emoticons. Emoticons are typically provided through a sequence of ASCII printable characters used to represent a human face and express an emotion. For example, emoticons that express happy or positive emotions are typically classified as "smileys" and may be provided by a combination of characters, such as ":)", ":>)", and so on. Likewise, emoticons that express negative emotions may be provided by a combination of characters, such as ":(", ":p", and so on. However, even though emoticons may add richness to the instant messaging experience, emoticons and text messages both rely on visual representations, thereby ignoring other senses of the users which may be utilized to convey ideas and emotions.

Accordingly, there is a continuing need for instant messaging with audio.

SUMMARY

Instant messaging with audio is described. In an implementation, audio is made available for inclusion in an instant messaging session through the use of an audio menu. The audio menu may be configured to include a plurality of audio representations each of which corresponding to an audio item that may be output to users that participate in the instant messaging session.

The audio menu, for example, may be displayed in an instant messaging user interface. The audio menu may include a plurality of audio representations of audio items taken from a content item, such as a movie, a television program, and so on. A user may select one of the audio representations, which causes a corresponding one of the audio items to be output to a plurality of users that participate in the instant messaging session. For instance, a user may select an audio representation titled "theme song" that, when selected, causes the audio item of the theme song to be output to both the user and the other users that participate in the instant messaging session. Thus, users that participate in the instant messaging session may cause an output of an audio item to other participants in the instant messaging session, thereby adding increased richness to the instant messaging experience such that both audio and visual senses are employed during the instant messaging session.

BRIEF DESCRIPTION OF THE DRAWINGS

The same numbers are used throughout the disclosure and figures to reference like components and features.

DETAILED DESCRIPTION

Overview

Instant messaging with audio is described. Traditional instant messaging relies on emoticons and pictures to add richness to the instant messaging experience. However, this richness is limited to the visual senses of a user and consequently does not take advantage of the user's other available senses. Therefore, by making audio available for incorporation during an instant messaging session, users are provided with additional functionality which may be utilized to express ideas and emotions in an efficient manner, thereby improving the richness of the instant messaging experience.

A plurality of audio items, for example, may be provided for output to each user in an instant messaging session. To choose one of the plurality of audio items, the user may interact with an audio menu which has a plurality of audio representations, each of which corresponding to one of the audio items. When a particular audio representation is selected, for instance, the corresponding audio item is output to each of the users that participate in the instant messaging session.

The audio items may be obtained from a variety of sources. For example, the audio items may be taken from content, such as a movie, a television program, a video-on-demand (VOD), pay-per-view content, a video game, and so on. A content provider, for instance, may create an audio menu having audio representations which were generated to correspond to audio items taken from the content. The audio menu may then be made available to users (e.g., over the Internet at a website, emailed to prospective consumers, and so on) to promote the content and/or a related item of content.

A movie studio, for instance, may create an audio menu having audio items taken from a particular movie and provide the created audio menu to users to promote an upcoming sequel to the movie. Thus, the audio menu may provide a custom soundboard that users may utilize to enhance an instant messaging session by using sounds, quotes, and lines from the previous and/or upcoming movies. The audio menu may also be utilized to link the instant messaging session to a specific movie theme by providing backgrounds and audio representations for the audio menu which correspond to the movie, such as by providing a background taken from a frame of the movie, generating the audio representations from images taken from the movie, and so on. Furthermore, the audio menu may be configured to allow users to access additional information about a specific content item (e.g., the movie), thereby enabling the instant messaging provider to provide additional marketing options to the content provider.

Exemplary Environment

Figure 1:
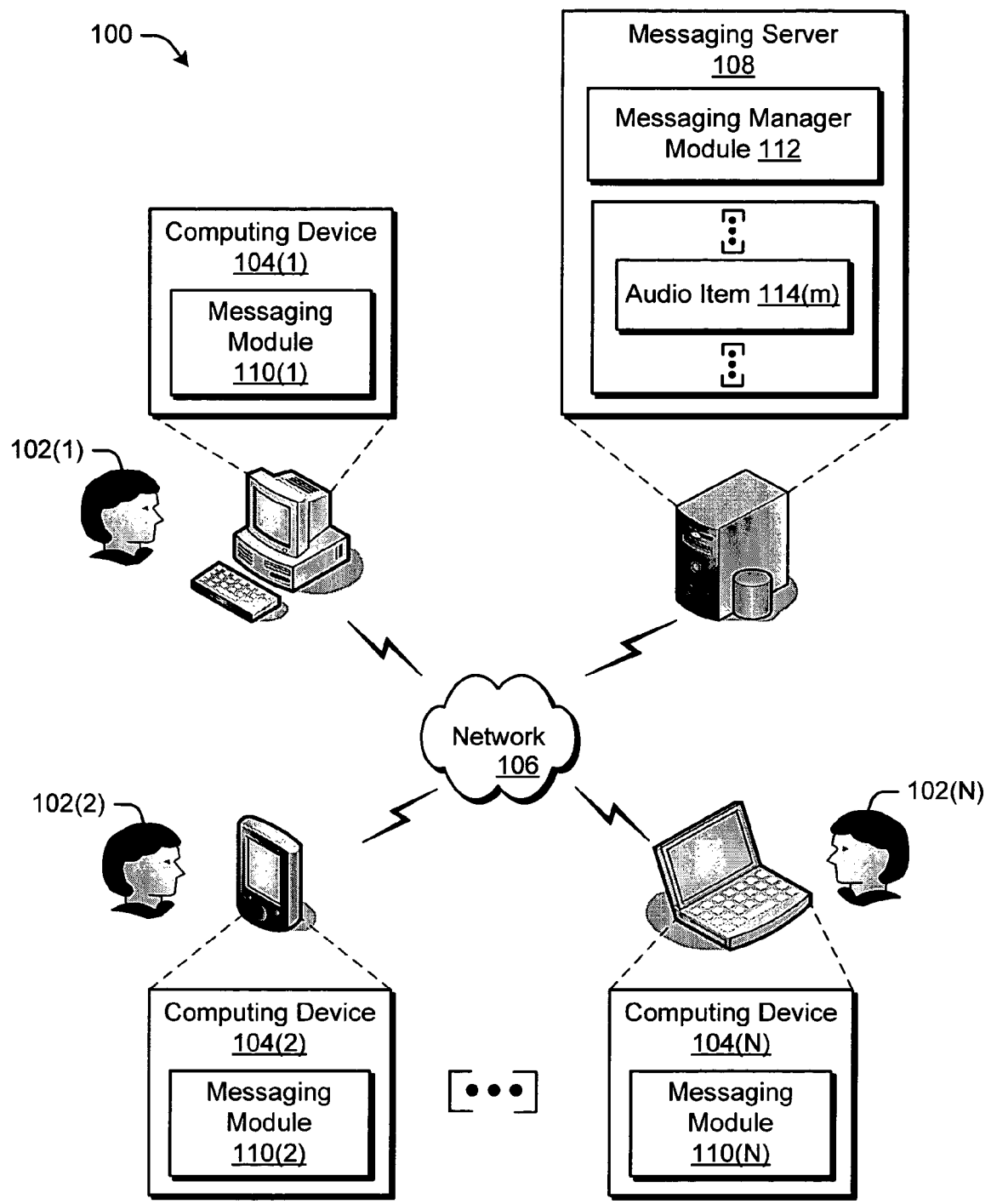
FIG. 1 is an illustration of an environment in an exemplary implementation which may implement instant messaging.

FIG. 1 is an illustration of an environment 100 in an exemplary implementation which may implement instant messaging. The environment 100 includes a plurality of users 102(1), 102(2), . . . , 102(N) which each utilize a respective one of a plurality of computing devices 104(1), 104(2), . . . , 104(N) to participate in an instant messaging session over a network 106. Although a computing device 104(1) configured as a desktop personal computer (PC), a computing device 104(2) configured as a personal digital appliance (PDA), and a computing device 104(N) configured as a notebook computer are shown, the plurality of computing devices 104(1)-104(N) may assume a wide variety of configurations. For example, the computing devices 104(1)-104(N) may also be configured as wireless phones, game consoles, tablet PCs, set-top boxes, and so on.

Additionally, although the network 106 is illustrated as the Internet, the network may assume a wide variety of configurations. For example, the network 106 may include a wide area network (WAN), a local area network (LAN), a Wireless network, a public telephone network, an intranet, and so on. Further, although a single network 106 is shown, the network 106 may be configured to include multiple networks. For instance, computing devices 104(1), 104(2) may be communicatively coupled via a peer-to-peer network to communicate, one to another. Each of the computing devices 104(1), 104(2) may also be communicatively coupled to a messaging server 108 over the Internet.

Each of the plurality of computing devices 104(1)-104(N) includes a respective one of a plurality of messaging modules 110(1)-110(N). Each messaging module is executable such that a respective one of the users 102(1)-102(N) may participate in an instant messaging session. Instant messaging provides a mechanism such that each of the users 102(1)-102(N), when participating in an instant messaging session, may send text messages to each other. The instant messages are typically communicated in real time, although delayed delivery may also be utilized, such as by logging the text messages when one of the users 102(1)-102(N) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In an implementation, the messaging modules 110(1)-110(N) communicate with each other through use of the messaging server 108. The messaging server 108, for instance, may include a messaging manager module 112 (hereinafter "manager module") which is executable thereon to route instant messages between the messaging modules 110(1)-110(N). For instance, a user 102(1) interacting with the computing device 104(1) may cause the messaging module 110(1) to form an instant message for communication to user 102(2). The messaging module 110(1) is executed to communicate the instant message to the messaging server 108, which then executes the manager module 112 to route the instant message to the computing device 104(2) over the network 106. The computing device 104(2) receives the instant message and executes the messaging module 110(2) to display the instant message to the user 102(2). In another instance, when the computing devices 104(1), 104(2) are communicatively coupled directly, one to another (e.g., via a peer-to-peer network), the instant messages are communicated without utilizing the messaging server 108.

As previously described, traditional instant messaging was limited such that only visual representations were utilized to communicate between participants in an instant messaging session. The messaging modules 110(1)-110(N) in this instance, however, may provide a plurality of audio items 114(m), where "m" can be any integer from one to "M", for incorporation into an instant messaging session.

User 102(1), for instance, may participate in an instant messaging session with user 102(2). During initiation of the instant messaging session, the messaging modules may retrieve the plurality of audio items 114(m) from the messaging server 108. Therefore, during the instant messaging session, either of the users 102(1), 102(2) may cause an output of one or more of the plurality of audio items 114(m) to both of the users 102(1), 102(2). In this way, each of the users 102(1), 102(2) that participates in the instant messaging session is provided with increased communication richness. For example, user 102(1) may select one of the audio items 114(m) which further reflects the mood of the user 102(1) for communication with a text message to user 102(2). Thus, user 102(2) is provided with both a text message and the selected audio item 114(m) and may therefore more easily and accurately determine the intended meaning of the communication from the user 102(1) through use of both visual and audio senses. Further discussion of communication during an instant messaging session using text and audio items may be found beginning in relation to FIG. 4.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the instant messaging strategies described below are platform-independent, meaning that the instant messaging strategies may be implemented on a variety of commercial computing platforms having a variety of processors.

Figure 2:
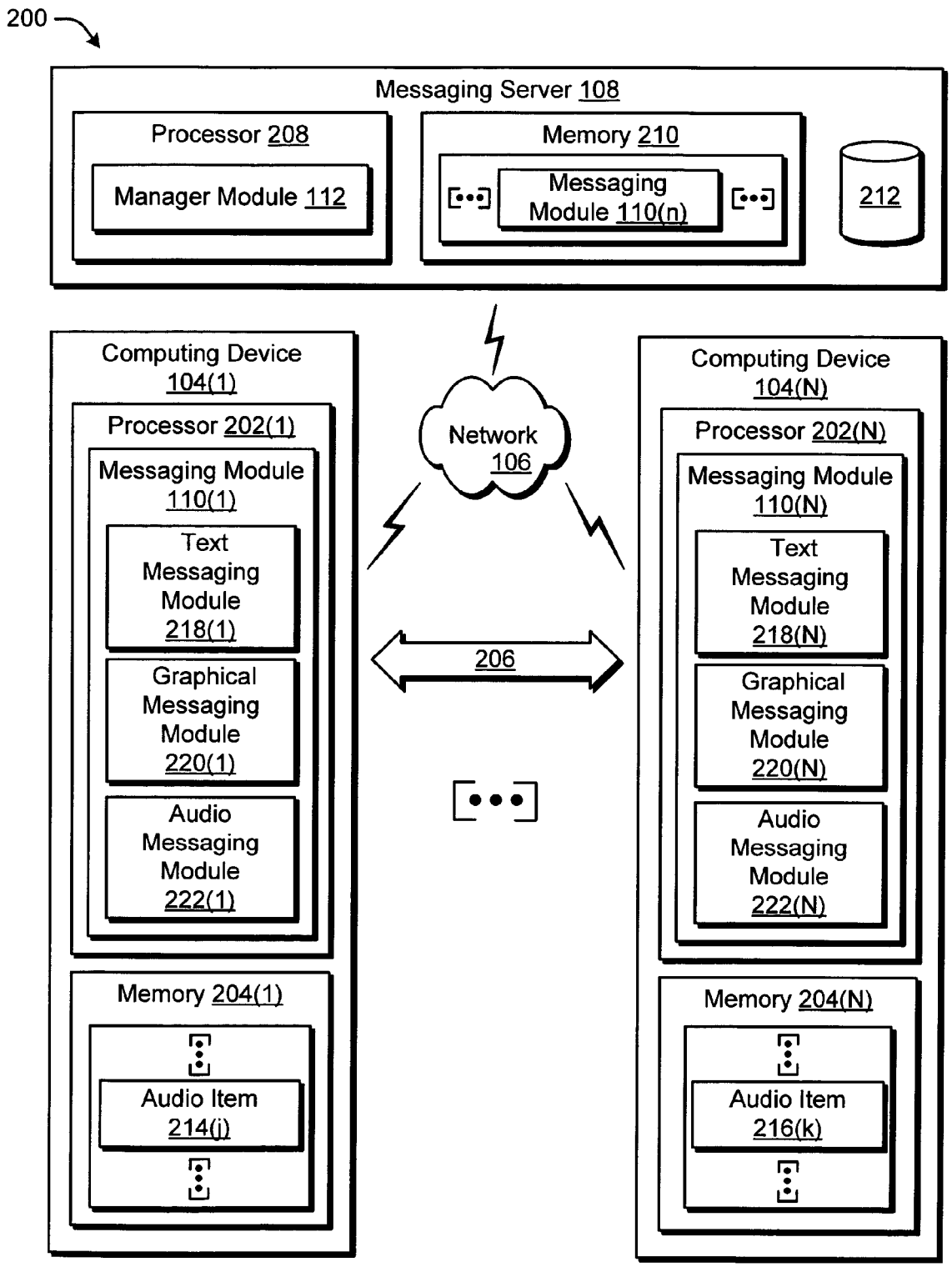
FIG. 2 is an illustration of a system in an exemplary implementation showing a messaging server and a plurality of computing devices of FIG. 1 in greater detail.

FIG. 2 is an illustration of a system 200 in an exemplary implementation showing the messaging server 108 and plurality of computing devices 104(1)-104(N) of FIG. 1 in greater detail. Each of the computing devices 104(1)-104(N) has a respective processor 202(1)-202(N) and memory 204(1)-204(N). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 204(1)-204(N) is shown for each of the respective computing devices 104(1)-104(N), a wide variety of types and combinations of memory may be employed, such as random access memory (RAM), hard disk memory, removable medium memory, and so forth.

Each of the plurality of computing devices 104(1)-104(N) includes a respective one of a plurality of messaging modules 110(1)-110(N) which is illustrated as being executed on a respective processor 202(1)-202(N) and is storable in a respective memory 204(1)-204(N). As previously stated, the messaging modules 110(1)-110(N) are executable to provide an instant messaging session, either in indirect communication through use of the messaging server 108 over the network 106 and/or directly over a peer-to-peer network 206, which is illustrated in FIG. 2 by a double-headed arrow to indicate that the peer-to-peer network 206 may be provided separately from the network 106.

The plurality of messaging modules 110(1)-110(N) may be provided to the plurality of computing devices 104(1)-104(N) in a variety of ways. In an implementation, the messaging modules 110(1)-110(N) are provided by the messaging server 108 in response to a request to initiate an instant messaging session. For example, computing device 104(1) may request initiation of an instant messaging session with computing device 104(N). If computing device 104(N) (and more particularly user 102(N) of FIG. 1) accepts initiation of the instant messaging session, the messaging server 108 executes the manager module 112 on a processor 208 to choose one of a plurality of messaging modules 110(n) which are stored in memory 210 on the messaging server 108. The chosen messaging modules 110(1), 110(N) are then communicated over the network 106 for execution on the respective computing devices 104(1), 104(N) to provide an instant messaging session.

Each of the messaging modules 110(1), 110(N) may include one or more of the plurality of audio items 114(m) of FIG. 1, which are stored in a database 212 accessible by the messaging server 108. For instance, the messaging module 110(1) may include a plurality of audio items 214(j), where "j" can be any integer from one to "J", that are chosen based on the preferences of the user 102(1) of FIG. 1 of the computing device 104(1). Likewise messaging module 110(N) may include a plurality of audio items 216(k), where "k" can be any integer from one to "K", that are chosen based on the preferences of the user 102(N) of FIG. 1 of the computing device 104(N). In another implementation, the pluralities of audio items 214(j), 216(k) match, one to another, such that each respective user 102(1), 102(N) of FIG. 1 has access to the same audio items.

Each of the messaging modules 110(1), 110(N) may include a variety of functionality that may be provided through execution of one or more modules. For example, each of the messaging modules 110(1), 110(N) may include a respective text messaging module 218(1), 218(N). The text messaging modules 218(1), 218(N) are executable to input, communicate, and display text in an instant messaging session.

Additionally, the messaging modules 110(1), 110(N) may also include respective graphical messaging modules 220(1), 220(N) which are executable to provide graphics in an instant messaging session. For example, the graphical messaging modules may be executable to provide a plurality of preconfigured emoticons in an instant messaging session, further examples of which are shown and described in relation to FIG. 3.

Further, the messaging modules 110(1), 110(N) may also include respective audio messaging modules 220(1), 220(N) which are executable to provide audio in an instant messaging session. For example, the audio messaging modules 220(1), 220(N) may be executable to provide one or more of the pluralities of audio items 214(j), 216(k) for output during an instant messaging session.

Figure 3:
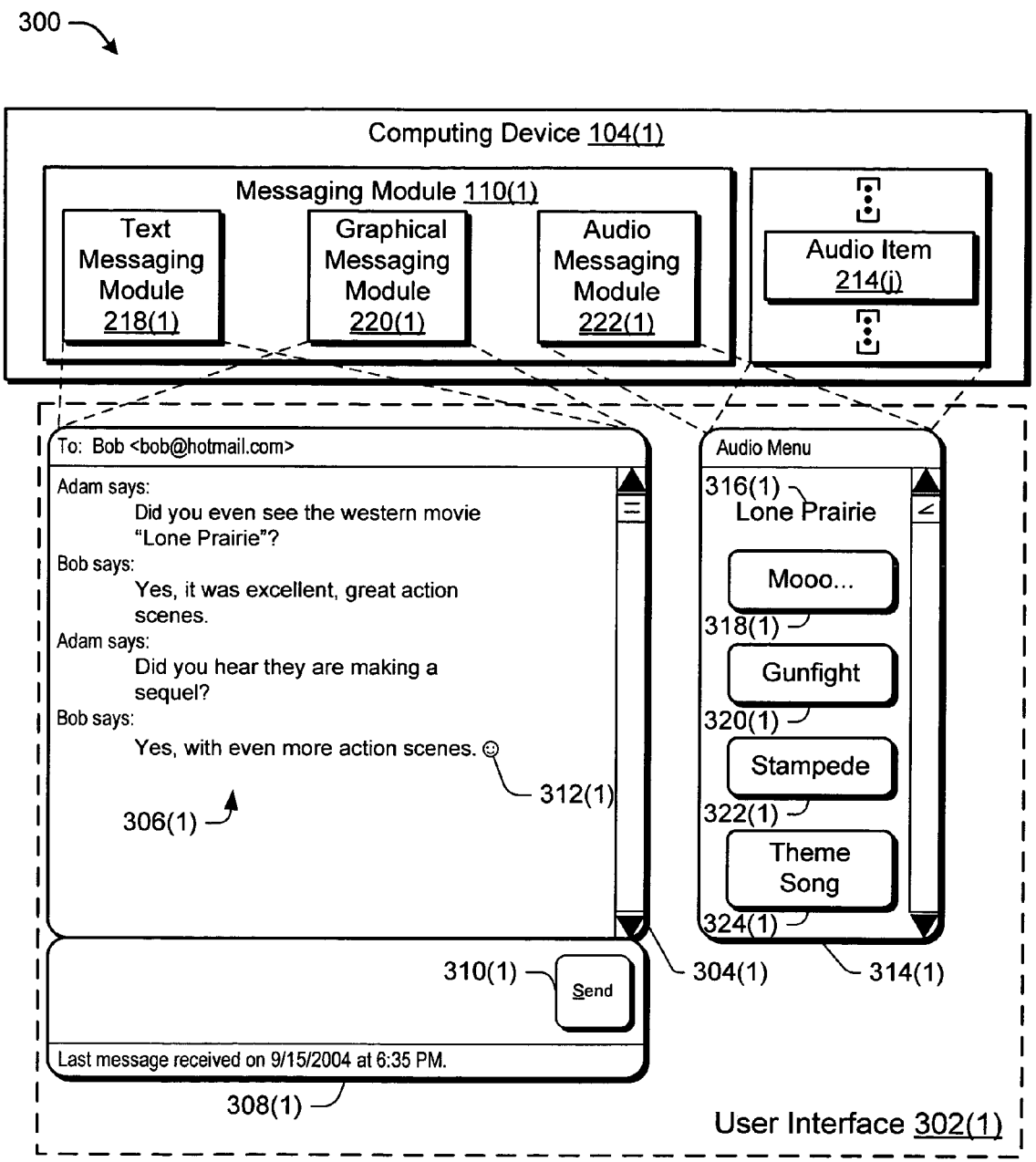
FIG. 3 is an illustration of a system in an exemplary implementation showing an instant messaging user interface provided through execution of a messaging module of FIG. 2.

FIG. 3 is an illustration of a system 300 in an exemplary implementation showing an instant messaging user interface 302(1) (hereinafter "user interface") provided through execution of the messaging module 110(1) of FIG. 2. The reference numbers of FIG. 3 are utilized to show correspondence with a particular computing device and user. For instance, reference number "302(1)" is utilized for the user interface to illustrate that the user interface 302(1) corresponds to the computing device 104(1), and consequently the user 102(1) of FIG. 1.

The messaging module 110(1) includes the text messaging module 218(1), the graphical messaging module 220(1), and the audio messaging module 222(1) of FIG. 2. When executed, the text messaging module 218(1) provides a text display window 304(1) to display text messages 306(1) that are communicated during an instant messaging session. The text messaging module 218(1) is also executable to provide a text entry window 308(1) for entry of text by the user 102(1) of FIG. 1 such that the user may enter and modify text before causing the text to be communicated by pressing the send 310(1) button.

The graphical messaging module 220(1) is executable on the computing device 104(1) for inclusion of one or more emoticons 312(1) with the text messages 306(1). For example, the graphical messaging module 220(1) may provide a plurality of preconfigured emoticons, such as the emoticon 312(1) of a smiley face as shown in FIG. 3. The preconfigured emoticons may be provided automatically through entry of text corresponding to the emoticon. For instance, when the user 102(1) of FIG. 1 enters the text ":)", the graphical messaging module 220(1) may be executed to automatically substitute the emoticon 312(1) of the smiley face. A variety of other emoticons may also be provided by the graphical messaging module 220(1), such as emoticons which display movement, interactive emoticons that respond to interaction by a user, and so on.

The audio messaging module 222(1) is executable on the computing device 104(1) to provide an audio menu window 314(1). The audio menu window 314(1) in this instance includes a title 316(1) of corresponding content from which the plurality of audio items 214(j) was taken. For example, a content provider (e.g., a movie producer, a video game programmer, and so on) may select the plurality of audio items 214(j) from a movie "Lone Prairie". The content provider may then generate a plurality of audio representations 318(1), 320(1), 322(1), 324(1) for inclusion in the audio menu 314 (1). The audio representations 318(1)-324(1) may be configured in a variety of ways, such as thumbnails of corresponding scenes of the movie, text representations of the audio items 214(j) as illustrated, and so on. Therefore, the user 102(1) of FIG. 1 may select one or more of the audio representations 318(1)-324(1) for causing an output of a corresponding one or more of the plurality of audio items 214(j), further examples of which may be found in relation to the following figures.

Figure 4:
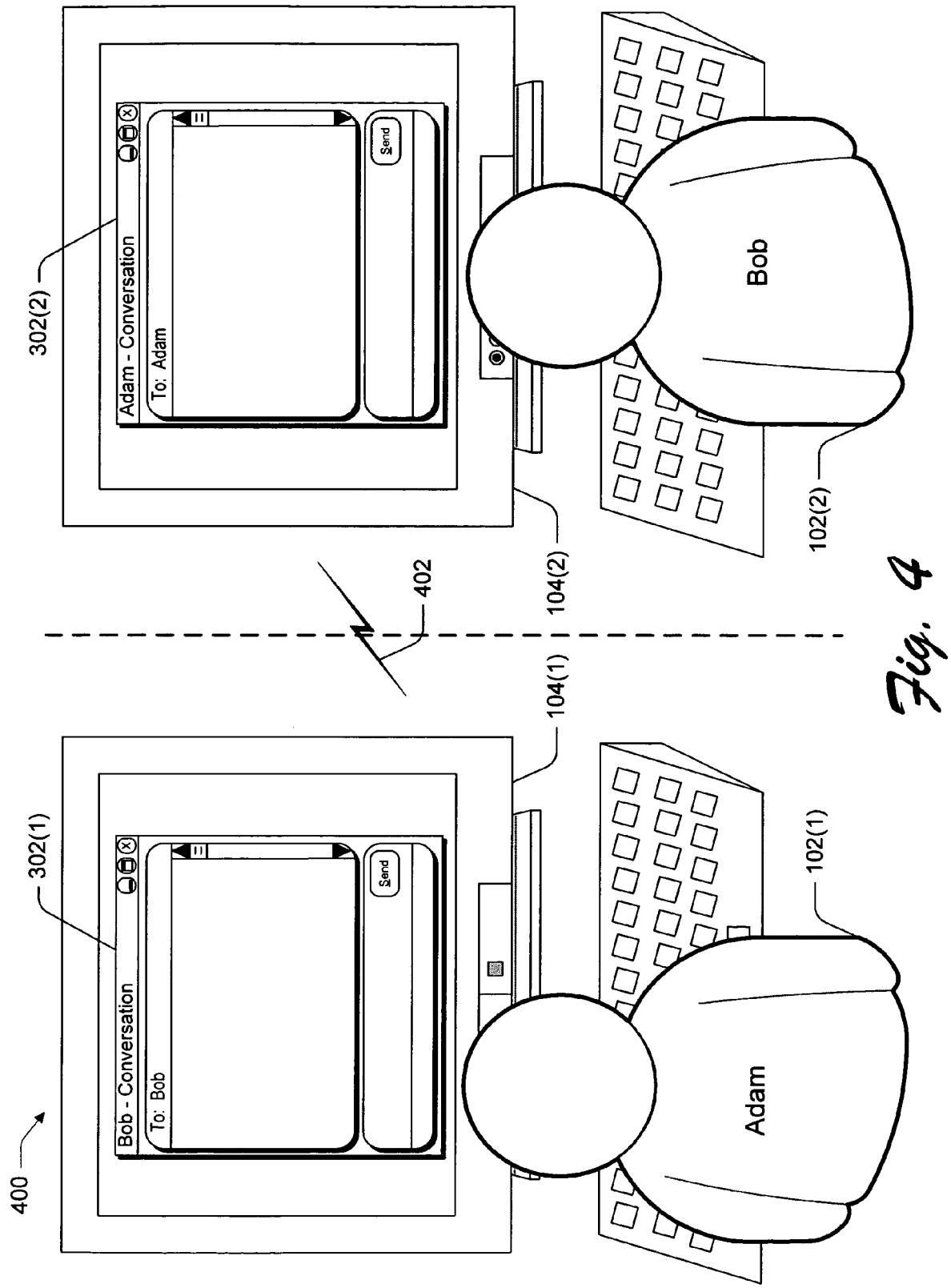
FIG. 4 is an illustration of a system having computing devices from FIG. 1 in which an exemplary instant messaging session that includes audio may be performed.

FIG. 4 is an illustration of a system 400 in which an exemplary instant messaging session that includes audio may be performed. A first user 102(1) (illustrated as "Adam") and a second user 102(2) (illustrated as "Bob") 102(2) are engaged in an instant messaging session. Text associated with instant messaging session is rendered for viewing by the first user 102(1) in the user interface 302(1) through use of the corresponding computing device 102(1). As previously described, the reference number 302(1) is utilized for the user interface to depict a correlation to the first user 102(1) and the computing device 104(1).

Similarly, text associated with instant messaging session is rendered for viewing by the second user 104(2) in the user interface 302(2) through use of the corresponding computing device 104(2). The reference number 302(2) is utilized for the user interface to depict a correlation to the second user 102(2) and the computing device 104(2).

The text messages that are exchanged are transmitted between computing device 104(1) and computing device 104 (2) via a network connection 402, which may be implemented, for example, over the network 106 of FIG. 1, over the peer-to-peer network connection 206 of FIG. 2, and so on. Although FIG. 4 is illustrated and described in relation to a plurality of users having the first and second users 102(1), 102(2) participating in an instant messaging session, it is recognized that the techniques described herein may also be applied to scenarios in which three or more users are participating in an instant messaging session.

Figure 5:
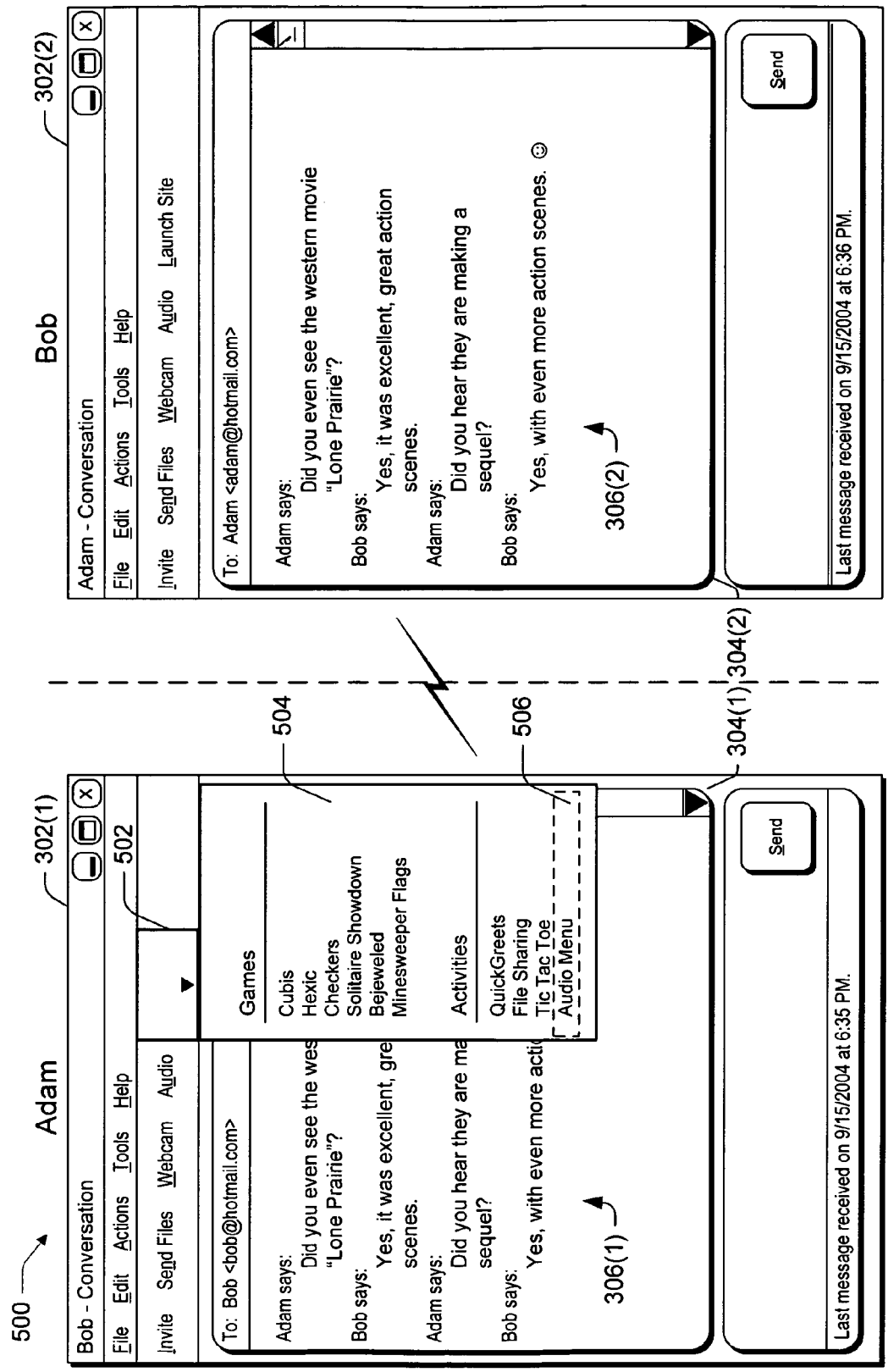
FIG. 5 illustrates an exemplary implementation of the system of FIG. 4 in which an audio menu is initiated.

FIG. 5 illustrates an exemplary implementation 500 of the system 400 of FIG. 4 in which an audio menu is initiated. In the illustrated instant messaging session, the first and second users have exchanged text messages 306(1), 306(2) which are displayed for viewing by the users in the respective text display windows 304(1), 304(2). To initiate the audio menu, the first user (i.e., Adam) selects a launch site menu item 502, which causes a drop-down menu 504 of available activities to be displayed. The first user 102(1) selects an audio menu item 506, which causes an audio menu invitation to be sent from the user interface 302(1) to the user interface 302(2). In an exemplary implementation, if the instant messaging session includes three or more individuals, audio menu invitations may be sent to each of the users. In another exemplary implementation, a user may specify one or more particular instant messaging session participants to utilize the audio menu.

Figure 6:
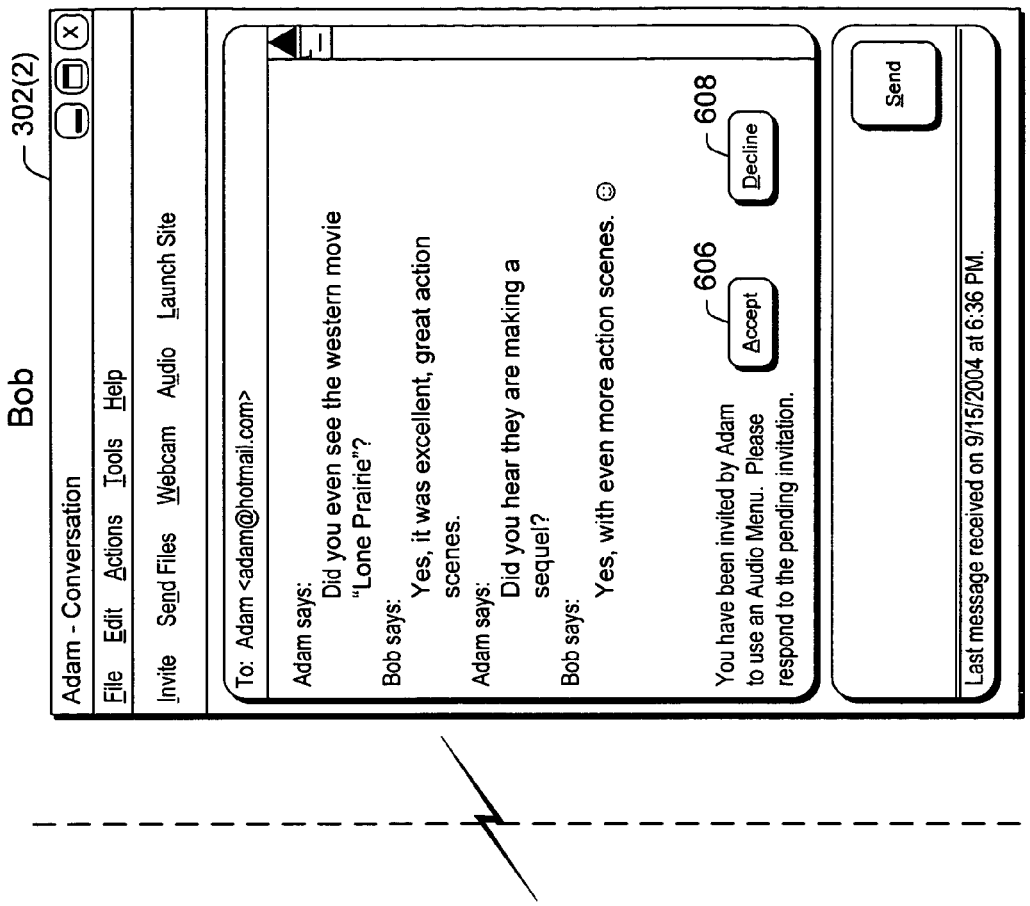
FIG. 6 illustrates an exemplary implementation of the system of FIG. 4 in which a user interface provides an output such that an audio menu invitation of FIG. 5 may be accepted or declined.
Figure 6:
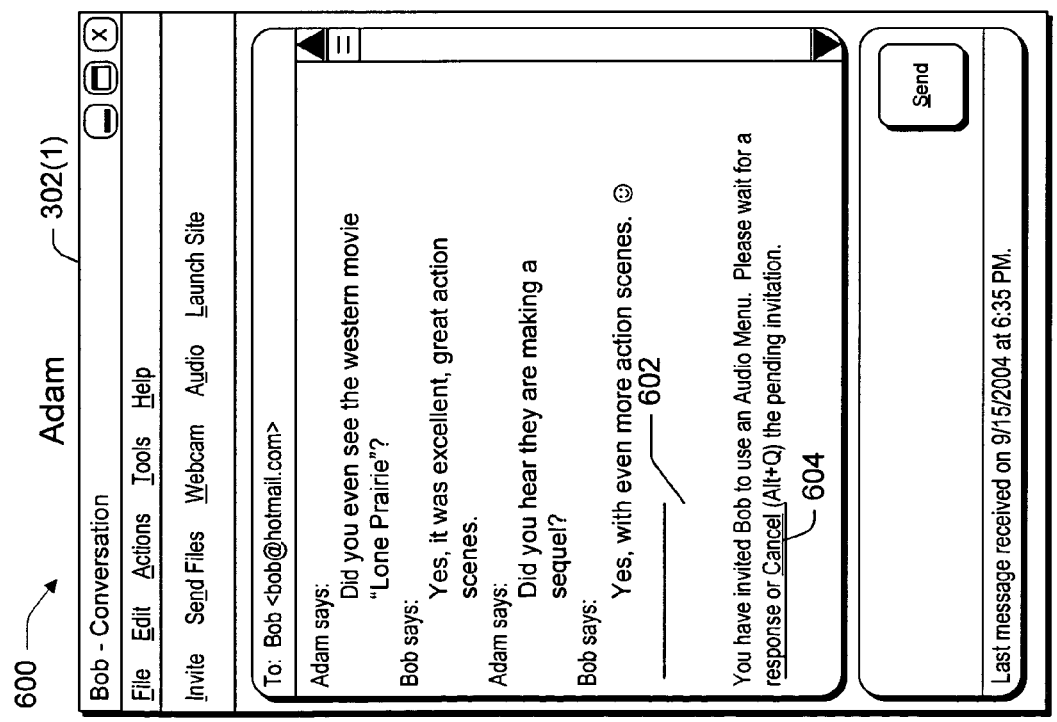

FIG. 6 illustrates an exemplary implementation 600 of the system 400 of FIG. 4 in which the user interface provides an output in which an audio menu invitation of FIG. 5 may be accepted or declined. As described above, selection of the audio menu item 506 of FIG. 5 causes an audio menu invitation to be sent to and displayed to the second user 102(1) through the user interface 302(2). When the audio menu invitation is sent to the user interface 302(2), a confirmation 602 is displayed in the user interface 302(1), indicating to the first user 102(1) (e.g., Adam) that the audio menu invitation has been sent to the second user 102(2) (e.g., Bob). In the illustrated example, the first user 102(1) can cancel the invitation by selecting the cancel link 604. Similarly, the second user 102(2) can accept or decline the invitation by selecting the accept link 606 or the decline link 608, respectively.

Figure 7:
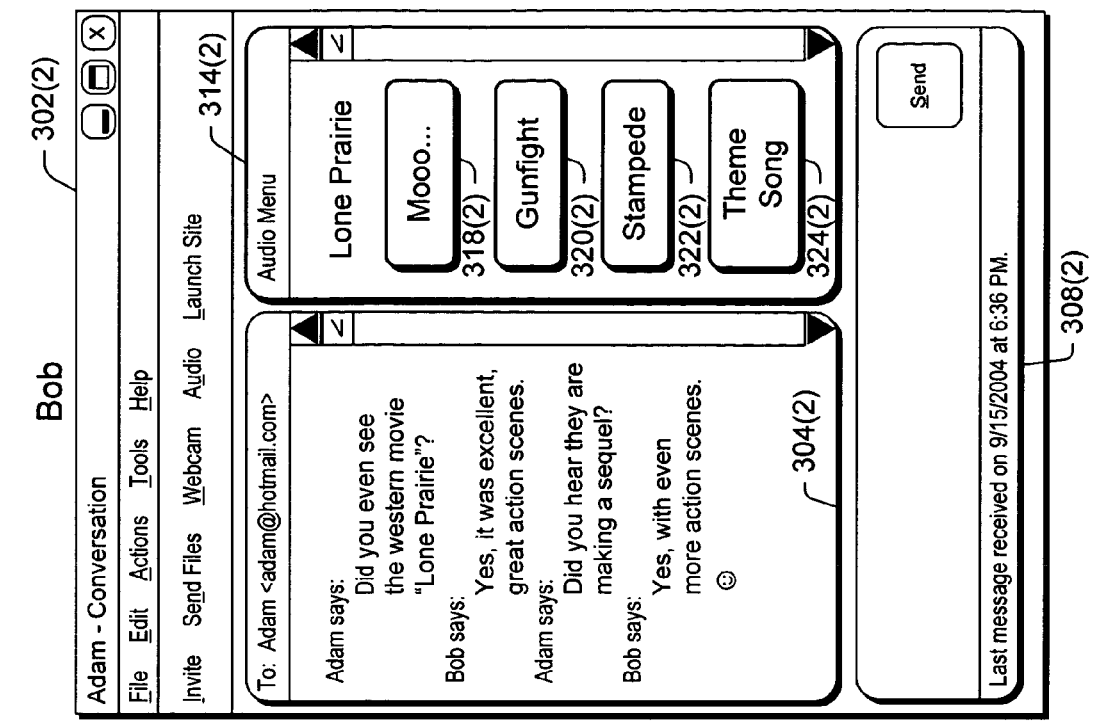
FIG. 7 illustrates an exemplary implementation of the system of FIG. 4 in which the user interfaces are reconfigured to provide a display of respective audio menus in response to acceptance of an accept link of FIG. 6 for accepting the audio menu invitation.
Figure 7:
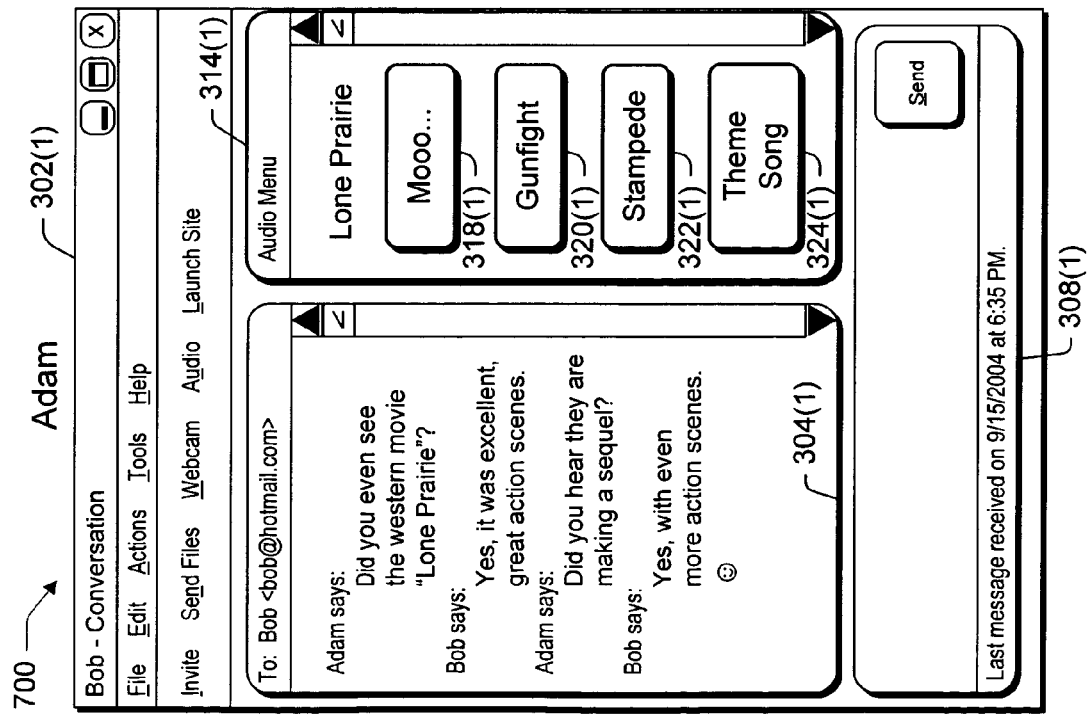

FIG. 7 illustrates an exemplary implementation 700 of the system 400 of FIG. 4 in which the user interfaces 302(1), 302(2) are reconfigured to provide a display of respective audio menus 314(1), 314(2) in response to acceptance of the accept link 606 of FIG. 6. The messaging modules 110(1), 110(2) of FIG. 1, in response to acceptance of initiation of the audio menu of FIG. 6, cause execution of respective audio messaging modules 222(1), 222(2) of FIG. 3 on respective computing devices 102(1), 102(2). In the illustrated instance of FIG. 7, the audio messaging modules 222(1), 222(2) cause audio menu windows 314(1), 314(2) to be included in respective user interfaces 302(1), 302(2). Each of the audio menu windows 314(1), 314(2) includes a plurality of audio representations 318(1)-324(1), 318(2)-324(2) as previously described in relation to FIG. 3. For example, audio menu window 314(1) includes an audio representation 318(1) of the sound of a cow, an audio representation 320(1) of the sound of a gunfight, an audio representation 322(1) of the sound of a stampede, and an audio representation 324(1) of the theme song of the corresponding content item (e.g., the movie "Lone Prairie). Likewise, the audio menu 314(2) of the user interface 302(2) for the second user 102(2) (e.g., Bob) contains audio representations 318(2)-324(2) that match the audio representations 318(1)-324(1) of the user interface 302(1) for the first user 102(1) (e.g., Adam). In another exemplary implementation, the audio representations included in the respective audio menu windows do not match, one to another.

To provide space in the user interfaces 302(1), 302(2) for display of the audio menu windows 314(1), 314(2), the messaging modules 110(1), 110(2) of FIG. 1 may be executed to dynamically resize the respective text messaging windows 304(1), 304(2) and/or the text entry windows 308(1), 308(2). For instance, the messaging modules 110(1), 110(2) of FIG. 1 may dynamically resize the text messaging windows 304 (1), 304(2) based on the size of the audio menu windows 314(1), 314(2) such that the plurality of audio representations 318(1)-324(1), 318(2)-324(2) are displayed as contemplated by a designer of the audio representations.

Figure 8:
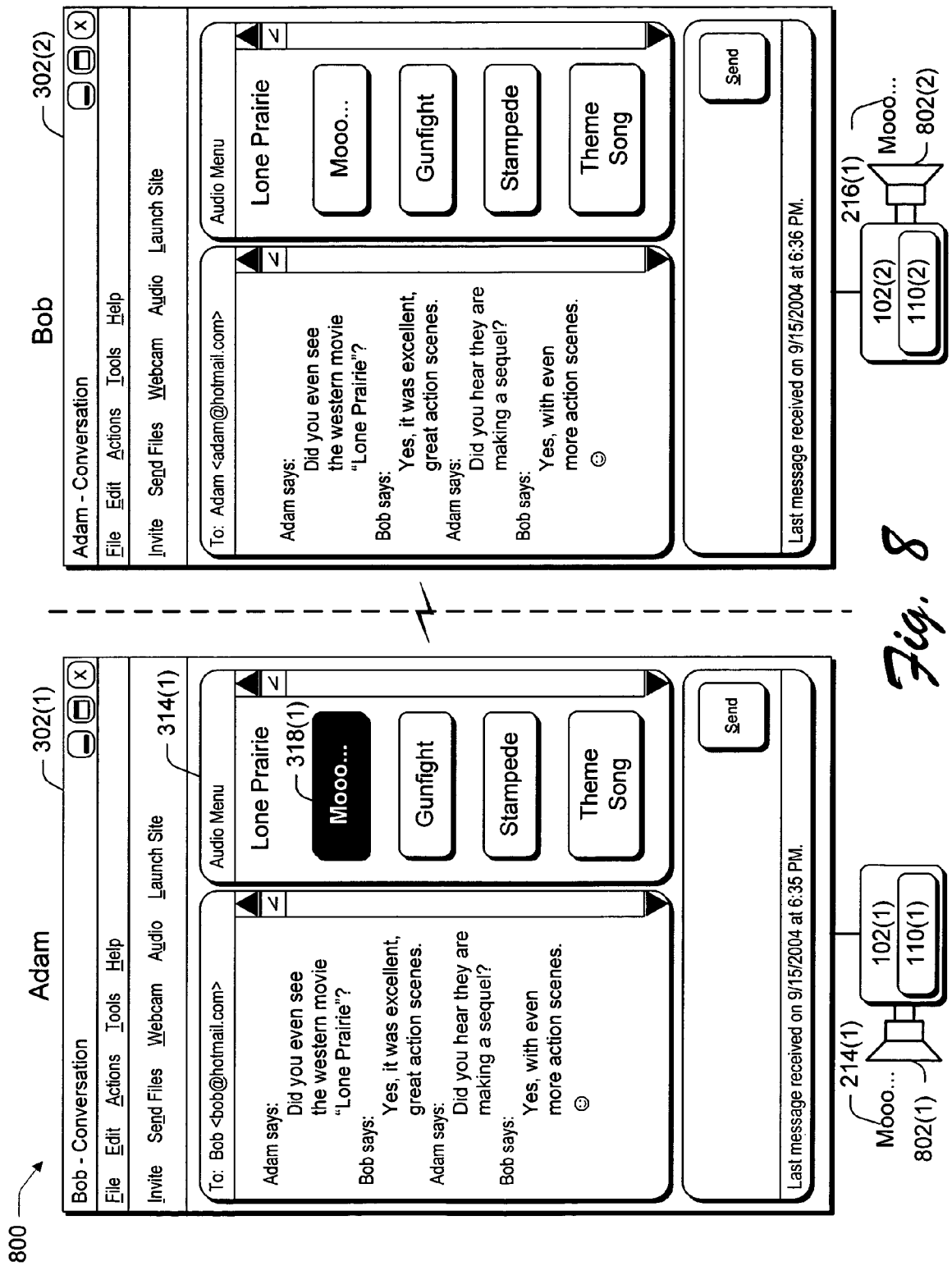
FIG. 8 illustrates an exemplary implementation of the system of FIG. 4 in which an output of an audio item is provided to each user of the instant messaging session in response to selection of one of the audio representations of the audio menu window that was output in FIG. 7.

FIG. 8 illustrates an exemplary implementation 800 of the system 400 of FIG. 4 in which an output of an audio item is provided to each user 102(1), 102(2) of the instant messaging session in response to selection of one of the audio representations of the audio menu window that was output in FIG. 7. As illustrated in FIG. 8, the first user 102(1) selects the audio representation 318(1) from the audio menu window 314(1). Selection of the audio representation 318(1) is illustrated in FIG. 8 as a negative image of the audio representation 318(1) illustrated in FIG. 7.

In response to the selection of the audio representation 318(1), the messaging module 110(1) causes a corresponding one of the plurality of audio items 214(j) of FIG. 2, in this instance audio item 214(1), to be output using an audio output device 802(1) that is illustrated as a speaker. Likewise, the messaging module 110(1) causes a corresponding one of the plurality of audio items 216(k) of FIG. 2, which in this instance is audio item 216(1), to be output by an audio output device 802(2) of the computing device 104(2). For instance, the messaging module 110(1) may communicate with the messaging module 110(2) of the second computing device 102(2) over the peer-to-peer connection 206 of FIG. 2 to cause output of the audio item 216(1). In another instance, the messaging module 110(1) may communicate with the other messaging module 110(2) using manager module 112 that is executed on the messaging server 108 of FIG. 2 to cause an output of the audio item 216(1) by the computing device 104(2).

Although this implementation described the output of the audio item by each computing device that participates in the instant messaging session, the user may also specify particular computing devices for output of the audio item. For instance, upon selecting an audio representation, the user may also specify a particular computing device that is to output the audio item, such as by specifying a particular user alias, a network address of the computing device, and so forth. Therefore, the audio item may be output by a particular collection of computing devices that participates in the instant messaging session such that the output is not performed by one of the computing devices that participates in the instant messaging session.

Exemplary Procedures

The following discussion describes instant messaging with audio that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 9:
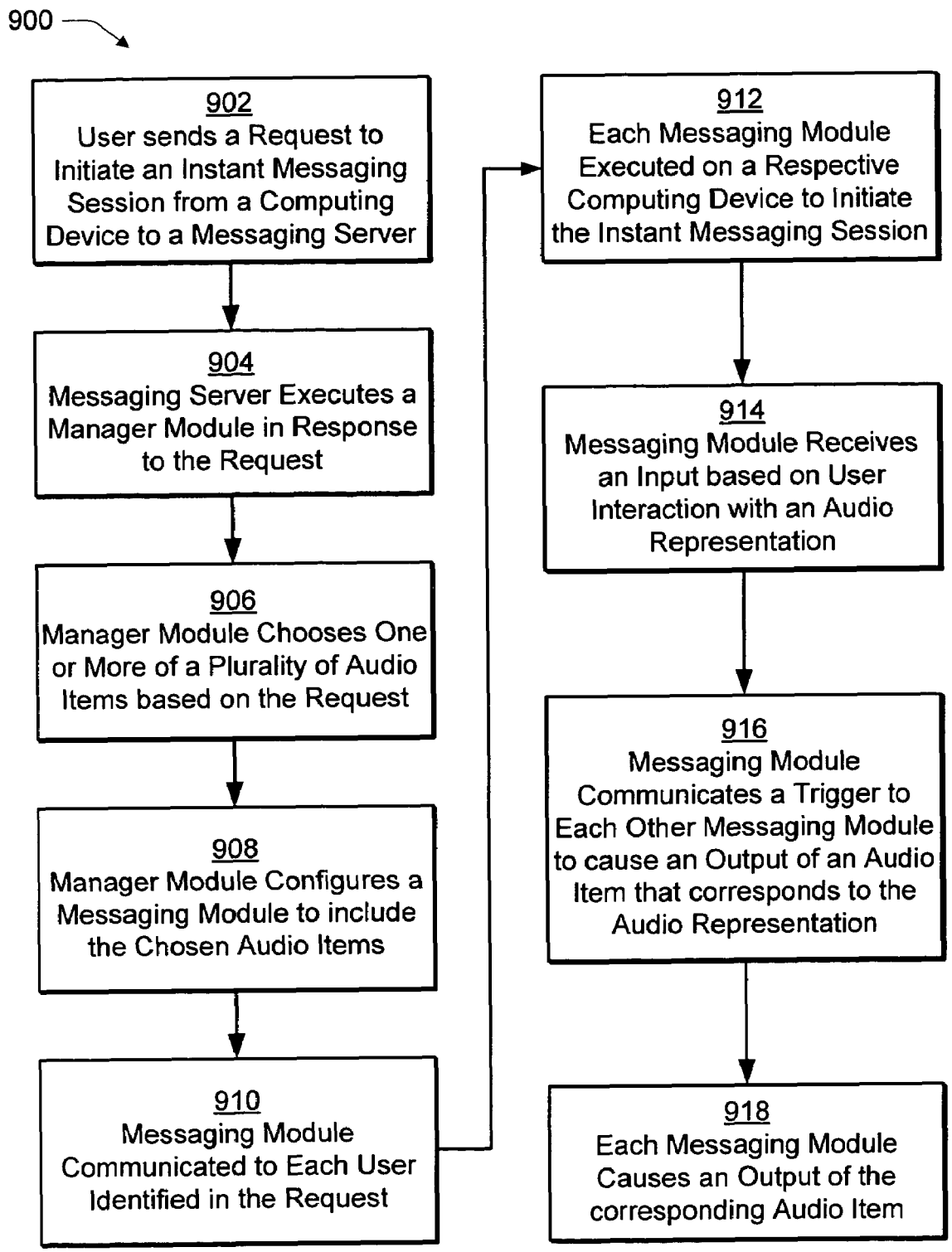
FIG. 9 is a flow diagram depicting a procedure in an exemplary implementation in which the messaging server of FIG. 2 provides messaging modules that are executable to provide an instant messaging session.

FIG. 9 is a flow diagram depicting a procedure 900 in an exemplary implementation in which a messaging server provides messaging modules that are executable to provide an instant messaging session. The following description of FIG. 9 will also be made in reference to the environment 100 of FIG. 1 and the system 200 of FIG. 2 and will therefore utilize reference numbers that are shown in FIGS. 1, 2 and 9.

First, a user 102(1) sends a request to initiate an instant messaging session from a computing device 104(1) to a messaging server 108 (block 902). The messaging server 108, in response to the request, executes the manager module 112 (block 904) to choose one or more of a plurality of audio items 114(m) based on the request (block 906). For example, the request may specify a particular content item of interest. Therefore, the manager module 112, when executed, chooses one or more of the audio items 114(m) based on the request, and specifically, audio items 114(m) that correspond to the particular content item.

Once the audio items are chosen (block 906), the manager module 112 configures a messaging module 110(n) to include the chosen audio items (block 908). For instance, the manager module 112 may choose a generic messaging module 110(n) and populate it with the chosen audio items. In another instance, the manager module 112 may choose a preconfigured messaging module that is configured to correspond to a particular content item. For example, the preconfigured messaging module may have an audio menu that includes a background, audio representations, and audio items taken from the particular content item of interest. Further discussion of formation of an audio menu may be found in relation to FIG. 11.

The messages modules are then communicated to each user identified in the request to initiate the instant messaging session (block 910). For example, the request that the user sent to initiate the instant messaging session (block 902) may identify one or more particular users to participate in the instant messaging session. The users may be identified in a variety of ways, such as through a network alias (e.g., a logon name of a particular user to a service that provides instant messaging), a network address, and so on. Each messaging modules is then executed on a respective computing device to initiate the requested instant messaging session (block 912).

During the execution of the messaging modules 110(1)-110(N), one of the messaging modules may receive an input based on user interaction with an audio representation. For example, a user may select audio representation 318(1) from the user interface 302(1) shown in FIG. 8. The messaging module 110(1), in response to the input (block 914), communicates a trigger to each other messaging module that participates in the instant messaging session to cause an output of an audio item that corresponds to the audio representation (block 916). For instance, the messaging module may communicate an identifier of the audio item that is suitable for enabling the messaging modules to locate the audio item. The identifier may be communicated in a variety of ways, such as directly between the computing devices over a peer-to-peer network, indirectly through communication through the messaging server 108, and so on.

Each messaging module is then executed to cause an output of the corresponding audio item (block 918). Thus, each computing device that participates in the instant messaging session may output the audio item chosen by any of the users of the computing devices.

In this procedure 900, the audio items were communicated to each of the computing devices before or during the initiation of the instant messaging session. In other words, the computing devices included the audio items before the corresponding audio representation was selected. Therefore, the audio items did not need to be communicated between the computing devices during the instant messaging session in response to selection of an audio representation by one of the users. In another implementation, an example of which is described in relation to the following figure, the audio items are communicated in response to selection of an audio representation by a user.

Figure 10:
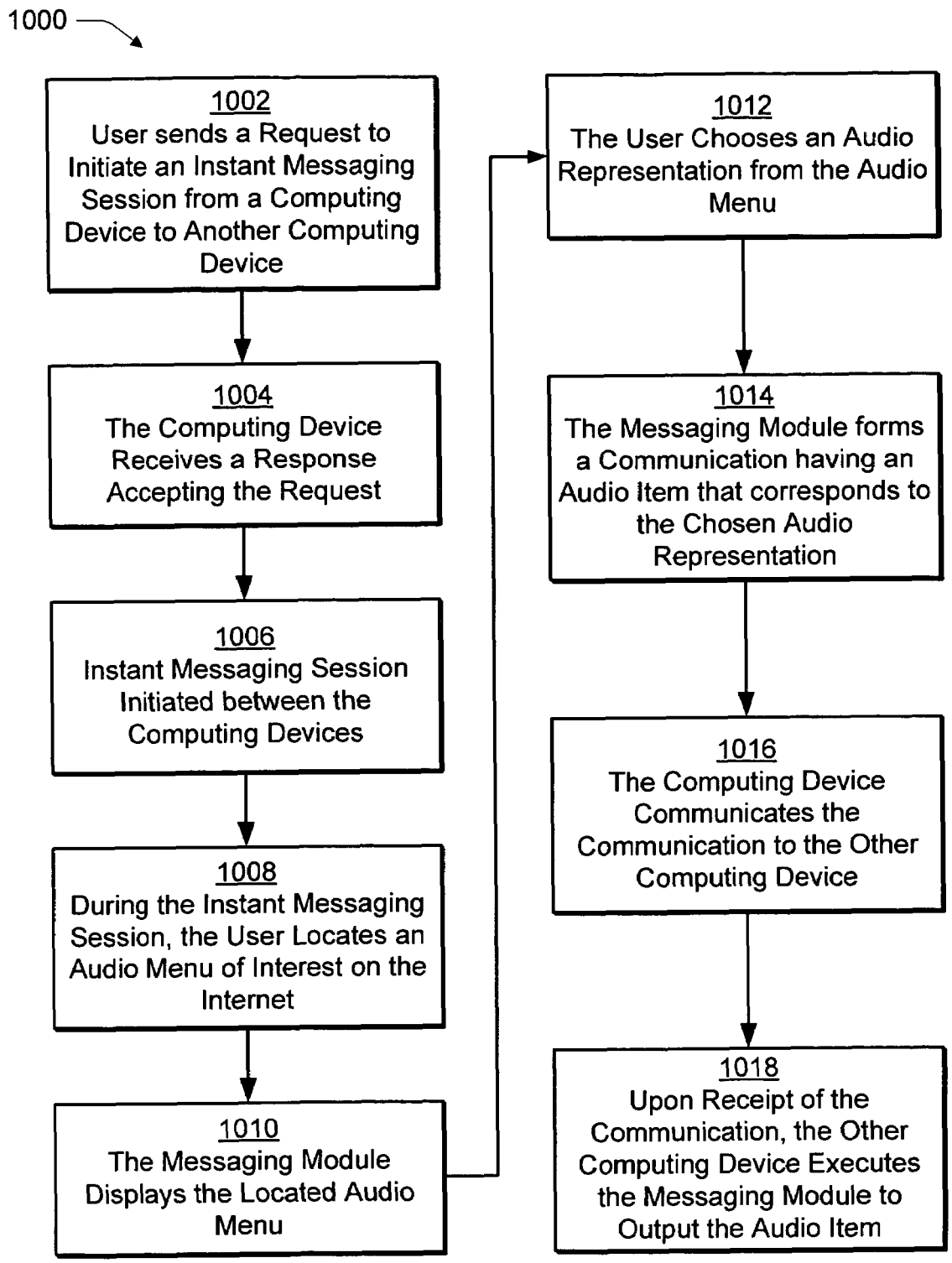
FIG. 10 is a flow diagram depicting a procedure in an exemplary implementation in which audio items are communicated in response to selection of an audio representation by a user.

FIG. 10 is a flow diagram depicting a procedure 1000 in an exemplary implementation in which audio items are communicated in response to selection of an audio representation by a user. A user sends a request to initiate an instant messaging session from a computing device to another computing device (block 1002). For example, the computing device may be communicatively coupled to the other computing device over a peer-to-peer network connection. The other user may then accept or decline the request, an example of which is shown and described in relation to FIG. 6.

The computing device then receives a response that specifies that the other user has accepted the request (block 1004). Therefore, an instant messaging session is initiated between the computing devices (block 1006). For instance, each of the computing devices that participates in the instant messaging session may provide a user interface for viewing and entering text messages. During the instant messaging session, the user may locate an audio menu of interest on the Internet (block 1008). For example, during the instant messaging session the user may also utilize a browser to browse web sites that have audio menus that are available for purchase. The user may select and purchase a particular audio menu, such as an audio menu that corresponds to a favorite movie and receive the audio menu from over the Internet. Further discussion of audio menu purchasing may be found in relation to FIG. 11.

The messaging module then displays the located audio menu (block 1010) in the user interface. For instance, the messaging module may dynamically resize the text display window to display the audio menu in a separate window. The user may then choose an audio representation from the audio menu (block 1012). In response to the choice, the messaging module forms a communication having an audio item that corresponds to the chosen audio representation (block 1014). The computing device communicates the communication to the other computing device (block 1016). Upon receipt of the communication, the other computing device executes the messaging module to output the audio item (block 1018).

Figure 11:
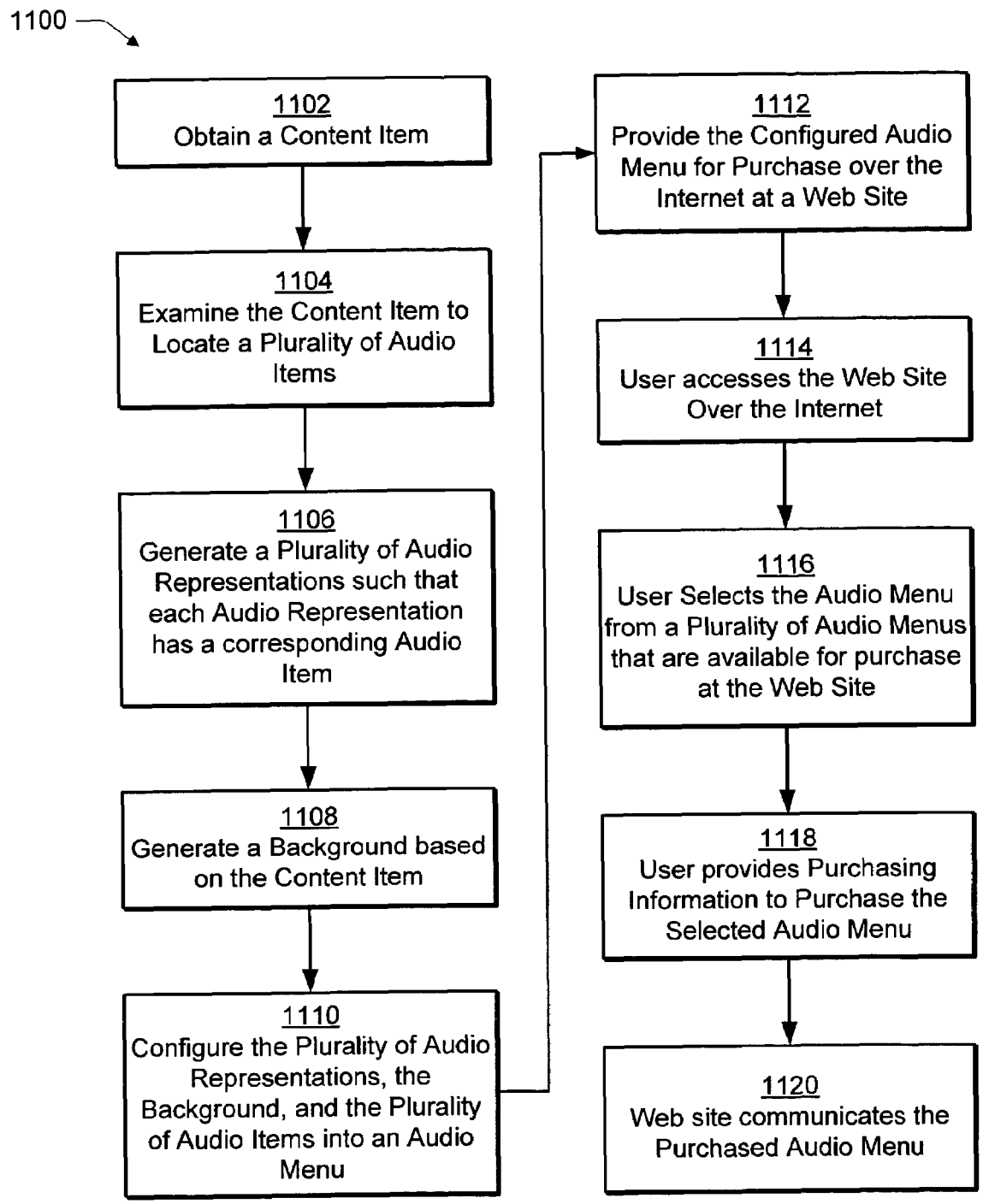
FIG. 11 is a flow diagram depicting a procedure in an exemplary implementation in which an audio menu is configured based on a content item and is then made available for purchase over the Internet.

FIG. 11 is a flow diagram depicting a procedure 1100 in an exemplary implementation in which an audio menu is configured based on a content item and is then made available for purchase over the Internet. First, a content item is obtained (block 1102). The content item may be obtained in a variety of ways. For example, a content provider may create the content item, such as by filming a movie, a television program, and so on. In another example, a broadcaster may receive the content item from the content provider, such as on a removable medium, communicated over a network, and so forth.

The content item is then examined to locate a plurality of audio items (block 1104). For instance, the content provider may examine the content item to locate audio items that, when heard by a user, are readily associated with the content item. Such audio items, for instance, may include memorable quotes taken from the content item, a portion of the theme song of the content item, memorable sound effects, and so forth. A plurality of audio representations is then generated such that each audio representation has a corresponding audio item (block 1106). The audio representations may be generated in a variety of ways. For instance, the audio representations may be taken from video data of the content item that corresponds to the audio data, from which, the audio item was obtained. For instance, a thumbnail may be generated that incorporates at least a portion of the video data such that the user may readily identify which audio item corresponds to the particular audio representation, such as a picture of a stampede and a sound of the stampede. In another instance, the audio representations are generated to include a text description of the corresponding audio item, an example of which is shown in FIG. 3.

A background is then generated based on the content item (block 1108). For example, the background may be generated to correspond to the content item in a manner similar to how the audio representations were generated, such as incorporating video data (e.g., images) from the content item, a title from the content item, images of the actors, and so on.

The plurality of audio representations, the background, and the plurality of audio item are then configured to form an audio menu (block 1110). The audio menu in this instance is thus preconfigured such that it corresponds to the obtained content item. The preconfigured audio menu may then be provided for purchase over the Internet at a web site (block 1112). The messaging server of FIG. 1, for instance, may provide a plurality of preconfigured audio menus, each of which corresponding to a different content item. A user may access the web site over the Internet (block 1114) and select an audio menu from a plurality of audio menus that are available for purchase at the web site (block 1116). The web site, for instance, may include functionality that allows the user to search the plurality of audio menus based on theme, title, actor, audio item (e.g., type of sound provided by each respective audio item), audio representation, and so forth. The user may then provide purchasing information to purchase the selected audio menu (block 1118), such as by providing credit card information, account numbers, user identification information, and so on. Once purchased, the web site communicates the purchased audio menu (block 1120). The purchased audio menu may be communicated in a variety of ways, such as to the user which purchased the audio menu, to other users that are identified by the user, to each participant in an instant messaging session, and so on. The users may then interact with the audio menu to cause an output of one or more audio items as previously described.

Although this implementation described the availability of the audio menu for purchase by a user, an instant messaging provider may provide a service for a content provider that is free to the user, but charge a fee to the content provider that provided the audio menu. For instance, the instance messaging provider may have a system that includes at least one server (e.g., messaging server 108 of FIG. 1) that is communicatively coupled to a network (e.g., network 106 of FIG. 1). The server may include the manager module 112 that arranges space in memory for storing one or more audio menus. Each audio menu, when stored in the memory, is available to a plurality of computing devices (e.g., computing devices 104(1)-104(N) of FIG. 1) over the network.

The instant messaging provider may provide space in the memory for a fee to one or more content providers that wish to provide audio menus to the computing devices. For example, a studio may desire to promote a movie and create an audio menu as previously described which relates to the movie. The studio may then purchase space in the memory of the instant messaging provider to distribute the audio menu to a plurality of users. Thus, the instant messaging provider may provide an advertising service, utilizing the audio menus provided by the content provider, to content providers for a fee. The fee may be computed in a variety of ways, such as based on memory space used, number of downloads, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving an input during an instant messaging session indicating a selection of at least one of a plurality of audio items from an audio menu, wherein the plurality of audio items are taken from a content item, wherein the input is provided through interaction with at least one of a plurality of audio representations displayed in the audio menu, wherein each said audio representation corresponds to a respective said audio item, and wherein the audio menu arranges the plurality of audio representations for display in a first window that receives the input and that is separate from a second window that is utilized to display text messages during the instant messaging session; and
causing an output of the selected audio item by one or more of a plurality of computing devices that participates in the instant messaging session, wherein the input specifies the plurality of computing devices that participates in the instant messaging session such that the output of the selected audio item is:
  caused for a sender selected subset of the plurality of computing devices that participates in the instant messaging session; and
  not caused for a separate sender selected subset of at least one other computing device that participates in the instant messaging session.

2. A method as described in claim 1, wherein:
the content item includes audio and video data;
the plurality of audio items are taken from the audio data; and
the plurality of audio representations are taken, at least in part, from the video data.

3. A method as described in claim 1, wherein the content item is selected from the group consisting of:
  a movie;
  a television program;
  a video-on-demand (VOD);
  a video game; and
  pay-per-view (PPV) content.

4. A method as described in claim 1, wherein the content item is a single content item.

5. A method as described in claim 1, further comprising purchasing the audio menu at a web site.

6. One or more computer readable storage media comprising computer executable instructions that, when executed on a computer, direct the computer to perform the method as recited in claim 1.

7. A method comprising:
examining content to locate a plurality of audio items;
generating a plurality of audio representations, wherein each said audio representation is selectable to cause an output of a corresponding said audio item by a plurality of computing devices that participates in an instant messaging session; and
arranging the plurality of audio representations for display in a first window in which the user selects an audio representation and that is separate from a second window that is utilized to display text messages during the instant messaging session; and
wherein each of the plurality of audio representations is also selectable to specify the plurality of computing devices such that the output of the corresponding audio item is:
caused for a sender selected subset of the plurality of computing devices; and
not caused for a separate sender selected subset of at least one other computing device that participates in the instant messaging session.

8. A method as described in claim 7, wherein the content is selected from the group consisting of:
  a movie;
  a television program;
  a video-on-demand (VOD);
  a video game; and
  pay-per-view (PPV) content.

9. A method as described in claim 7, wherein the content is a single content item.

10. A method as described in claim 7, wherein:
the content includes audio and video data;
the plurality of audio items are selected from the audio data; and
the plurality of audio representations are taken, at least in part, from the video data.

11. A method as described in claim 7, further comprising purchasing the plurality of audio representations and the plurality of audio items at a web site.

12. A method as described in claim 7, further comprising:
arranging the plurality of audio representations for display in a user interface that is utilized for interaction during the instant messaging session;
creating a background for the user interface that corresponds to the content; and
providing the plurality of audio representations and the background on a network for purchase by a user over the network.

13. One or more computer readable storage media comprising computer executable instructions that, when executed on a computer, direct the computer to perform the method as recited in claim 7.

14. A method comprising:
accessing a web site over a network; and
purchasing a plurality of audio representations and a plurality of audio items through interaction with the web site, wherein:
  each of the audio representations corresponds to a respective one of the plurality of audio items;
  the plurality of audio items are taken from a content item; and the plurality of audio representations are:
    displayable during an instant messaging session, wherein the audio representations are selectable after a receiving user receives and the receiving user accepts an audio menu invitation during the instant messaging session; and
    selectable to cause the respective said audio item to be output on a sender selected subset of at least one computing device that participates in the instant messaging session, and further selectable to cause the respective said audio item not to be output on a separate sender selected subset of at least one computing device that participates in the instant messaging session.

15. A method as described in claim 14, wherein the network is an Internet.

16. A method as described in claim 14, wherein the purchasing is performed during the instant messaging session.

17. A method as described in claim 14, wherein the content item is selected from the group consisting of:
  a movie;
  a television program;
  a video-on-demand (VOD);
  a video game; and
  pay-per-view (PPV) content.

18. A method as described in claim 14, wherein the content item is a single content item.

19. A method as described in claim 14, wherein:
the content item includes audio and video data;
the plurality of audio items are selected from the audio data; and
the plurality of audio representations are taken, at least in part, from the video data.

20. A method as described in claim 14, wherein the plurality of representations are displayable in a first window that is separate from a second window that is utilized to display text messages during the instant messaging session.

21. A method as described in claim 14, wherein the purchasing further includes purchasing a background for the plurality of audio representations that corresponds to the content item.

22. One or more computer readable storage media comprising computer executable instructions that, when executed on a computer, direct the computer to perform the method as recited in claim 14.

23. One or more computer readable storage media comprising computer executable instructions that, when executed on a computer, direct the computer to:
 display a first window for display of text messages communicated during an instant messaging session;
 display a second window having a plurality of audio representations that are selectable during the instant messaging session, wherein the second window is displayed after a receiving user receives and the receiving user accepts an audio menu invitation; and
 when one or more said audio representations are selected from within the second window, cause an output of a respective one or more of a plurality of audio items for a sender selected subset of members participating in the instant messaging session, and further does not cause an output for a separate sender selected subset of members participating in the instant messaging session.

24. One or more computer readable storage media as described in claim 23, wherein the audio items are taken from a single content item.

25. One or more computer readable storage media as described in claim 24, wherein the single content item is selected from the group consisting of:
 a movie;
 a television program;
 a video-on-demand (VOD);
 a video game; and
 pay-per-view (PPV) content.

26. One or more computer readable storage-media as described in claim 24, wherein the computer executable instructions further direct the computer to provide an interface for purchasing the plurality of audio representations and the plurality of audio items at a web site.

27. A computing device comprising:
 a processor; and
 memory configured to maintain a messaging module that is executable on the processor to:
  establish an instant messaging session over a network; and
  output a plurality of audio representations for display on a display device during the instant messaging session, wherein:
   the plurality of audio representations correspond to a plurality of audio items taken from a content item, wherein the plurality of audio representations are arranged for display in a first window that is separate from a second window that is utilized to display text messages during the instant messaging session; and
   each said audio representation is selectable from within the first window to:
    cause an output of a corresponding said audio item at a sender selected subset of one or more computing devices that participate in the instant messaging session; and
    not cause an output for a separate sender selected subset of at least one other computing device that participates in the instant messaging session.

28. A computing device as described in claim 27, wherein the network is an Internet.

29. A computing device as described in claim 27, wherein the content item is selected from the group consisting of:
 a movie;
 a television program;
 a video-on-demand (VOD);
 a video game; and
 pay-per-view (PPV) content.

30. A computing device as described in claim 27, further comprising a module that is executable to purchase the plurality of audio representations and the plurality of audio items over the network from a web site.

31. A system comprising:
 a network;
 a plurality of computing devices communicatively coupled to the network; and
 at least one server communicatively coupled to the network and including a manager module, wherein:
  the manager module is executable to communicate a messaging module to each of the plurality of computing devices in response to a request for initiation of an instant messaging session between the plurality of computing devices;
  each said messaging module is executable on a respective said computing device to output a plurality of audio representations of audio items during the instant messaging session, wherein the plurality of audio representations are arranged for display in a first window that is separate from a second window that is utilized to display text messages during the instant messaging session; and
  each said audio representation is selectable from within the first window to:
   cause an output of a respective said audio item on a sender selected subset of the plurality of computing devices that participate in the instant messaging session; and
   not cause an output for a separate sender selected subset of at least one other computing device that participates in the instant messaging session.

32. A system as described in claim 31, wherein the network is an Internet.

33. A system as described in claim 31, wherein the audio items are taken from a content item.

34. A system as described in claim 33, wherein the content item is selected from the group consisting of:
 a movie;
 a television program;
 a video-on-demand (VOD);
 a video game; and
 pay-per-view (PPV) content.

35. A system as described in claim 31, wherein at least one said computing device includes a module that is executable thereon to purchase the plurality of audio representations and the plurality of audio items over the network from the at least one server.

36. A system comprising at least one server having a processor and memory, wherein:
 the at least one server is configured to be communicatively coupled to a network;
 the at least one server includes a manager module that is executable on the processor to arrange space in the memory for storing one or more audio menus;
 each said audio menu is executable to output a plurality of audio representations of audio items during an instant messaging session;

wherein the audio items are selected by the sender to be output at a sender selected subset of the devices participating in the instant messaging session, and not output for a separate sender selected subset of the devices participating in the instant messaging session;

each said audio menu is displayed when a receiving user of said audio menu receives and the receiving user of said audio menu accepts an audio menu invitation during the instant messaging session, wherein the audio menu invitation is configured to allow a sending user to cancel the audio menu invitation before the receiving user accepts the audio menu invitation;

each said audio menu, when stored in the memory, is available to the plurality of computing devices over the network; and the space in the memory is available to a content provider to store at least one said audio menu in the memory for a fee.

* * * * *